(12) United States Patent
Deng et al.

(10) Patent No.: US 11,829,841 B2
(45) Date of Patent: Nov. 28, 2023

(54) MECHANICAL ENERGY-BASED SELF-POWERING COUNTING SYSTEM

(71) Applicant: BEIJING INSTITUTE OF TECHNOLOGY, Beijing (CN)

(72) Inventors: Fang Deng, Beijing (CN); Yeyun Cai, Beijing (CN); Ning Ding, Beijing (CN); Chengwei Mi, Beijing (CN); Jiachen Zhao, Beijing (CN); Xianghu Yue, Beijing (CN); Bin Zhang, Beijing (CN); Chen Chen, Beijing (CN); Wenjie Chen, Beijing (CN); Jia Zhang, Beijing (CN); Jie Chen, Beijing (CN)

(73) Assignee: Beijing Institute of Technology, Beijing (CN)

( * ) Notice: Subject to any disclaimer, the term of this patent is extended or adjusted under 35 U.S.C. 154(b) by 263 days.

(21) Appl. No.: 17/468,260

(22) Filed: Sep. 7, 2021

(65) Prior Publication Data
US 2022/0147789 A1 May 12, 2022

Related U.S. Application Data

(63) Continuation of application No. PCT/CN2019/000171, filed on Aug. 27, 2019.

(30) Foreign Application Priority Data

Mar. 6, 2019 (CN) .......................... 201910168517.4

(51) Int. Cl.
*G06M 1/10* (2006.01)
*H02J 7/00* (2006.01)

(52) U.S. Cl.
CPC .......... *G06M 1/108* (2013.01); *H02J 7/0068* (2013.01)

(58) Field of Classification Search
CPC .......... G06M 1/00; G06M 1/10; G06M 1/102; G06M 1/108; G06M 3/08; G06F 11/30
USPC ......................................... 327/27–32, 38, 39
See application file for complete search history.

(56) References Cited

U.S. PATENT DOCUMENTS 10,261,874 B2 * 4/2019 Bryant ................ G06F 11/3062
11,467,936 B2 * 10/2022 Chaiken ............... G06F 11/076

* cited by examiner

*Primary Examiner* — Hai L Nguyen
(74) *Attorney, Agent, or Firm* — Yong Chen

(57) ABSTRACT

A mechanical energy-based self-powering counting system is provided. The system includes an electromagnetic power generator, a count measuring circuit, a count energy supply circuit, a controller and a wireless transmission module. The electromagnetic power generator is driven by an external device and produces an electric signal and outputs the electric signal to the controller after passing it through the count measuring circuit. The controller processes the received signal, updates a count according to certain programming rules and sends data to the wireless transmission module. The energy from the electromagnetic power generator flowing through the count measuring circuit can supply power to the controller. An energy storage module in the count energy supply circuit performs voltage feedback on the controller. The controller monitors the voltage of the energy storage module to control whether it enters a charging state.

6 Claims, 6 Drawing Sheets

MECHANICAL ENERGY-BASED SELF-POWERING COUNTING SYSTEM

FIELD

The present disclosure relates to the field of electronic power technology, and in particular to a mechanical energy-based self-powering counting system.

BACKGROUND

As the popularity of electronic devices has increased, sensors are becoming more common in our lives. For example, when detecting the pressing life of a device, it is necessary to use an infrared sensor, a pressure sensor, or the like to calculate the number of times the device is pressed, by which the life span of the device is calculated. Typically, these sensors require additional power from a power supply (battery or generator). The power supply unit and the sensor are two independent parts, that is, the power supply unit is only responsible for supplying power to the sensor and the system, and the sensor is only responsible for sampling the information, and transmits the collected data to the system. In this case, it is necessary to design the circuit of the system based on sensor location and power usage. Despite sensor miniaturization, sensors still take up space and consume power, and their circuit lose energy loss in energy transmission.

Current technology includes wireless self-powering shoes that can count the number of steps the user walks, which convert mechanical energy into electrical energy using friction. But counting can only be performed after the electric energy is accumulated. Because the user's height, weight and walking habits are different, the calculation reference value needs to be calibrated every first time, the procedure is complicated and the counting accuracy cannot be ensured.

SUMMARY

In view of above, this invention provides a mechanical energy-based counting system which combines self-powering and sensing function into one, and can realize the counting function while generating electricity.

The technical solution of the present invention is as follows:

A mechanical energy-based self-powering counting system, including: an electromagnetic power generator, a measuring circuit, a count energy supply circuit, a controller, and a wireless transmission module, wherein: the electromagnetic power generator generates electricity by being driven by an external device, and transmits an input electrical signal to the count measuring circuit and an input signal to the count energy supply circuit, respectively; the count measuring circuit outputs a high level or low level to the controller based on the input electrical signal; the count energy supply circuit enters a charging state or stops charging under the control of controller, and also supplies power to the controller; the controller is configured to monitor a voltage of the count energy supply circuit, and control the count energy supply circuit according to a relationship between the voltage and a set voltage threshold; and the controller conducts counting operations according to a pattern regarding high level output and a corresponding rule of whether to count a specific high level output, and transmits count data to the wireless transmission module for an external apparatus to read the count data.

In some embodiments, the count energy supply circuit comprises at least one voltage comparator. In some embodiments, the count energy supply circuit comprises a rectifier circuit, an energy storage module and a protection circuit. The rectifier circuit rectifies the electric energy and then supplies the rectified electric energy to the energy storage module. The energy storage module feeds its voltage to the controller and outputs energy to the protection circuit. The protection circuit supplies power to the controller through rectification and filtering. In some embodiments, the energy storage module comprises an energy storage component and an energy storage circuit, where the energy storage circuit is configured to perform voltage equalization and stabilization and current stabilization, and delivers electric energy to the energy storage component for energy storage; and the energy storage component feeds its voltage to the controller. The energy storage component can be selected from the group consisting of a lithium battery, a supercapacitor or a flexible supercapacitor. The controller controls whether to wirelessly charge the wireless transmission module by using the energy storage module depending on the charging type of the wireless transmission module.

Beneficial Effects:

1. In many situations, electrical signals generated during power generation have some recognizable characteristics, or the changes of the electrical signals are closely related to the changes of certain physical quantities. Utilizing such relationship, electrical signals generated in power generation can be used to perform functions of sensors, thereby reducing the number of sensors. Therefore, this invention effectively combines the functions of a power generator and a sensor, so that the combination device can perform counting while generating electric power. No sensors need to be used in the circuit. One circuit can accomplish the functions of power supply and counting at the same time, thereby simplifying circuit design and saving energy. The system can be self-powered without the need of additional power supply.
2. The invention can be used in a wide range of applications. By utilizing the inventive system of the present invention, a device can realize counting function, and the size of the device can be adjusted based on actual needs. The invention is suitable for all devices that have a reciprocating motion, and is very flexible.
3. The energy storage component of the invention can be selected from a lithium battery, a super capacitor or a flexible super capacitor, so that the inventive counting system has wide range of applications and good compatibility, and is not restricted by the types of the energy storage component.

Figure 1:
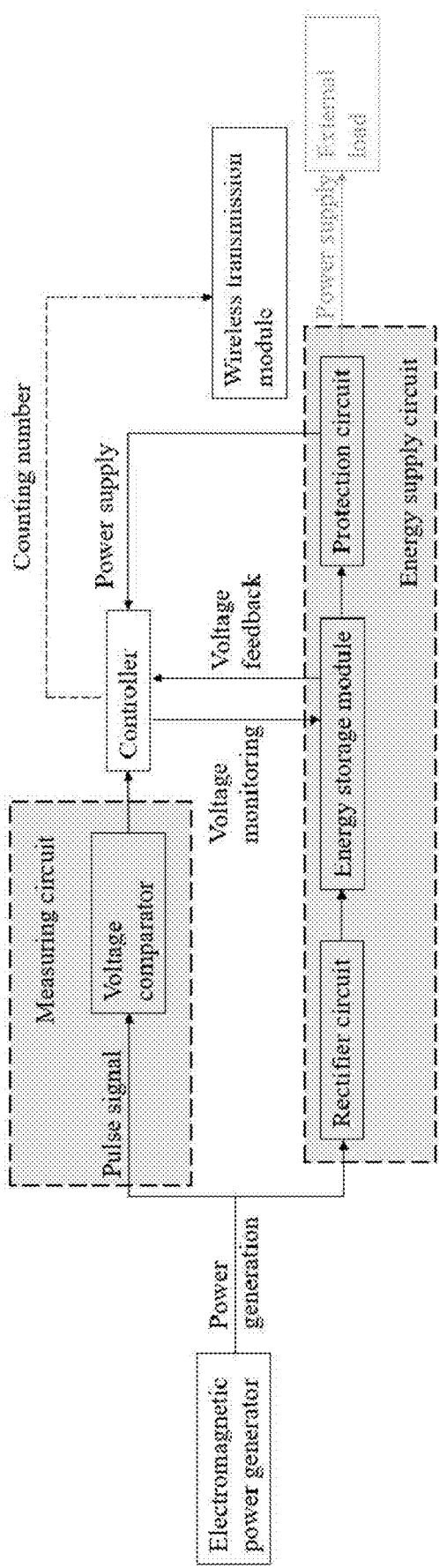
FIG. 1 is a schematic diagram of a system of the present invention.

Wherein the reference numerals used in the figures:
1—mechanical energy-based self-powering counting system used in the stapler, 2—stapler, 3—mechanical energy-based self-powering counting system used in a pressure-type stamp, 4—pressure-type stamp, 5—mechanical energy-based self-powering counting system used in a shoe, 6—shoe.

DETAILED DESCRIPTION OF THE EMBODIMENTS

The present invention will be described in detail below with reference to the drawings and embodiments.

The present invention provides a mechanical energy-based counting system that is self-powering while capable of performing sensing, which can be applied to a device with reciprocating motion characteristics. The system does not need additional power supply or additional sensors, can perform energy harvesting and sensing functions at the same time, thereby can be used to monitor device life, monitor human health, and other purposes.

As shown in FIG. 1, the system includes an electromagnetic power generator, a count measuring circuit, a count energy supply circuit, a controller and a wireless transmission module. The count measuring circuit includes a voltage comparator connected to the electromagnetic power generator and the controller, respectively. If the electromagnetic power generator outputs more than one signal, more than one voltage comparator is provided correspondingly, and only one single signal is output to the controller after combination. The count energy supply module includes a rectifier circuit, an energy storage module, and a protection circuit. The rectifier circuit is connected to the electromagnetic power generator and the energy storage module respectively. The energy storage module includes an energy storage circuit and an energy storage component, and they are connected to the controller and the protection circuit, respectively. The protection circuit is connected with the controller. There is no wire connection between the controller and the wireless transmission module. The controller will make the decision of whether the wireless transmission module requires charging according to the type of the module.

Specifically, the electromagnetic power generator starts to generate electricity under the driving of the reciprocating motion of the external device, and electrical signals are supplied to the voltage comparator and the rectifier circuit respectively. The voltage comparator outputs a corresponding high level or low level to the controller according to the input signal. When the controller receives a high level, the counting is performed according to a certain programming rule. The programming rule is written based on the correspondence between the level output and whether to count according to the level output. A new record is delivered to the wireless transmission module via a wireless transmission protocol according to certain preset programming rule.

The rectifier circuit rectifies the received alternating current into direct current and supplies the direct current to the energy storage module. The energy storage circuit in the energy storage module delivers electrical energy to the energy storage component by equalizing and stabilizing. The energy storage component can be a lithium battery, a battery, a supercapacitor or a flexible supercapacitor. The energy storage module feeds the voltage across the energy storage component to the controller, and the controller performs voltage monitoring on the energy storage component. After the voltage of the energy storage component reaches a certain threshold, the controller sends a control signal to stop charging the energy storage component. When the voltage of the energy storage component is smaller than the threshold, the controller sends a control signal to start charging the energy storage component. The controller determines whether the energy storage module wirelessly supplies the wireless transmission module according to the type of the wireless transmission module. The energy storage module then delivers electrical energy in the energy storage component to the protection circuit. The protection circuit protects against overvoltage, overcurrent and short circuit, and supplies power to the controller.

The protection circuit can also be connected to an external load, charge the external load by using the energy in the energy storage component of the energy storage module.

Figure 2:
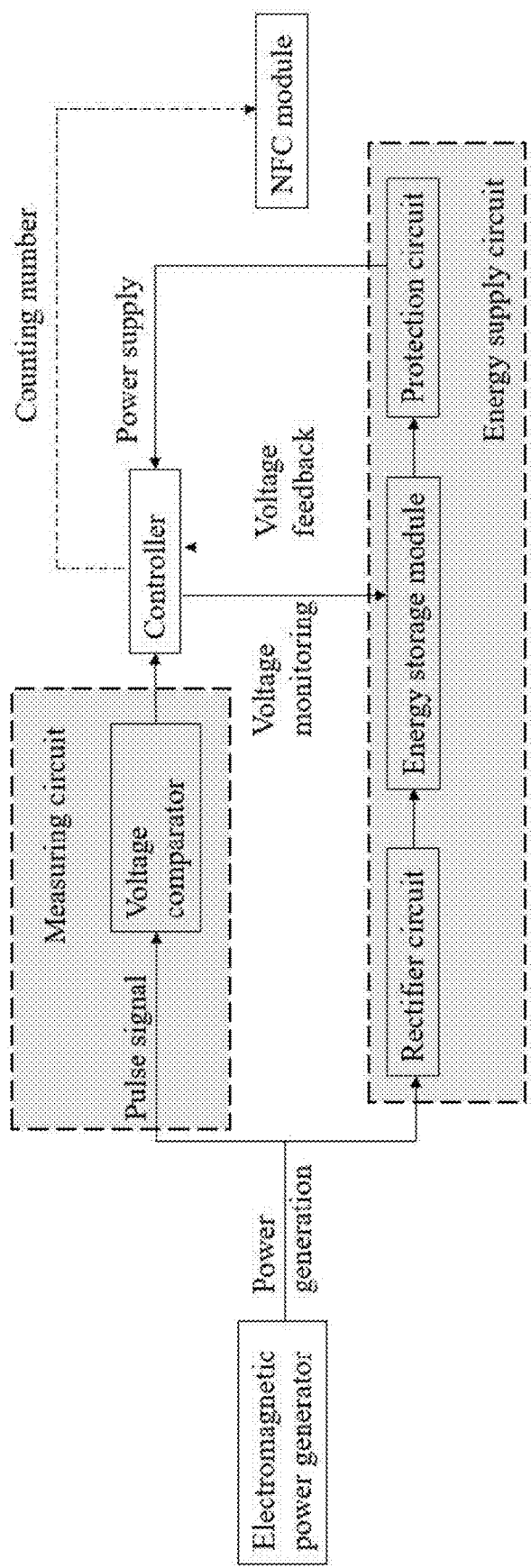
FIG. 2 is a schematic diagram of system principle of Embodiment A.
Figure 3:
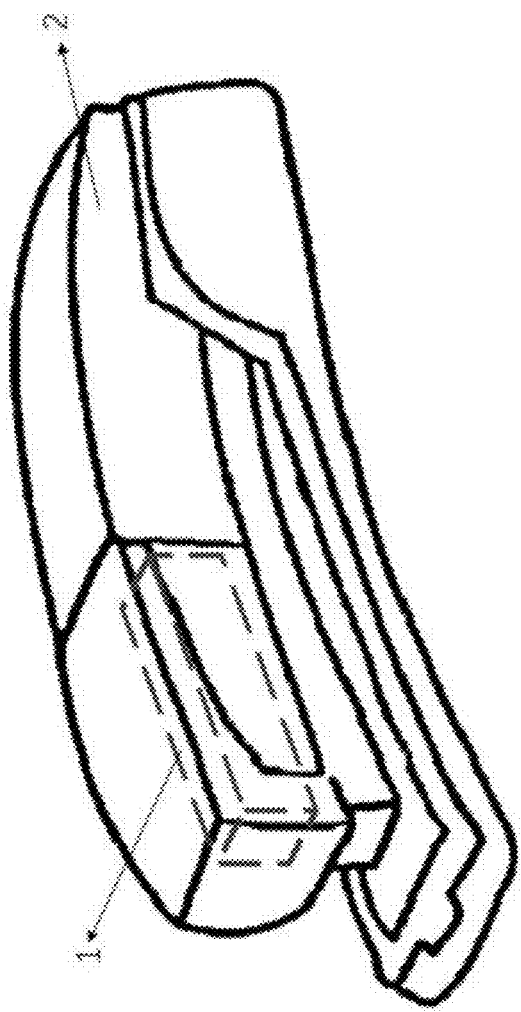
FIG. 3 is a schematic diagram of a structure of Embodiment A.
Figure 4:
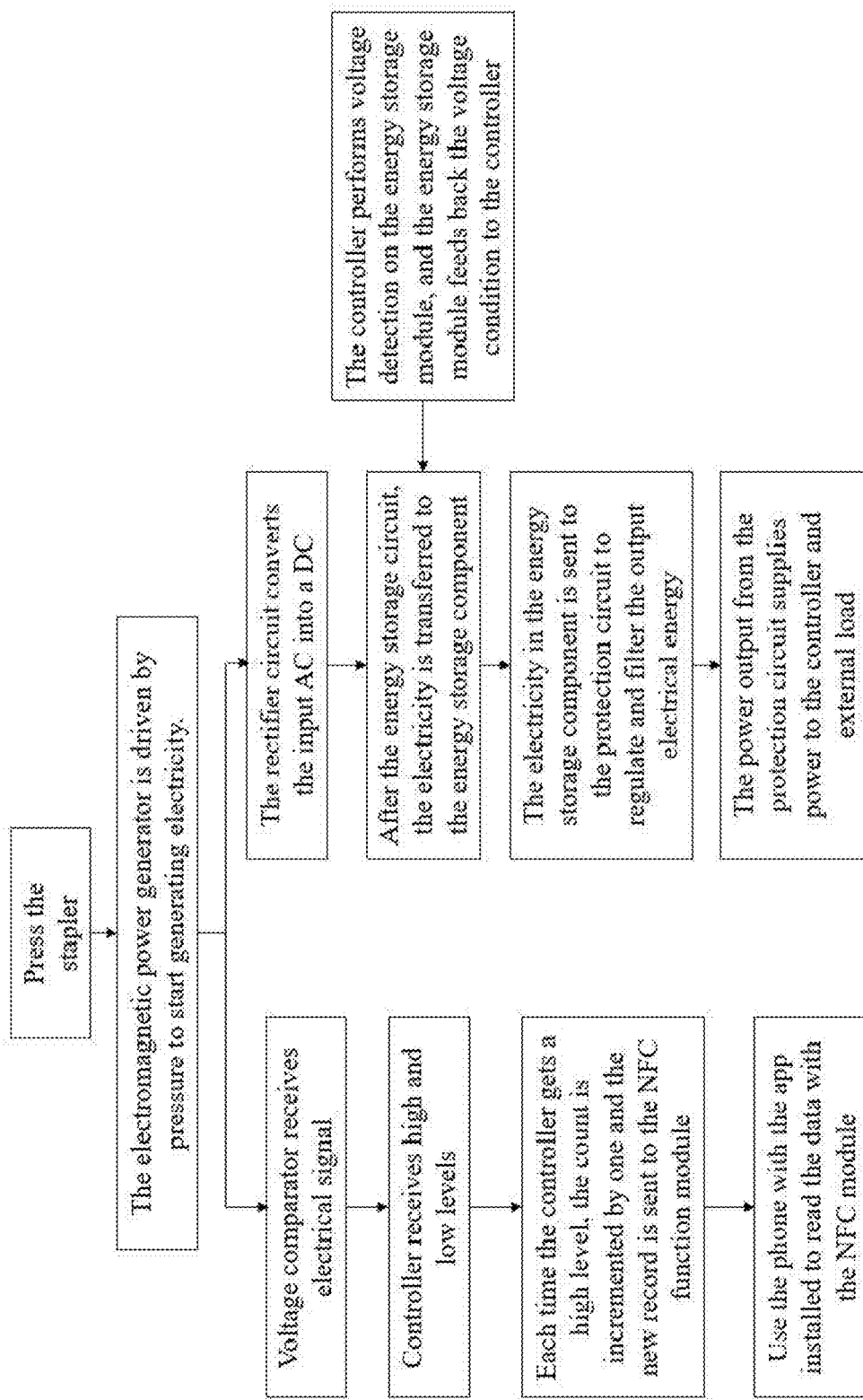
FIG. 4 is a flowchart of the operation of Embodiment A.

FIGS. 2-4 show Embodiment A where an inventive system of the present invention is used. In Embodiment A, a stapler 2 having a standard reciprocating motion mode is selected as an application system, and NFC is used as a wireless transmission module in the mechanical energy-based counting system that can be used in the stapler 1. A small supercapacitor acts as an energy storage component. When the stapler 2 is pressed, the electromagnetic power generator is driven by pressure to start power generation, and the generator generates a small pulse signal when pressed and raised. The pulse signal is passed to the voltage comparator, which outputs a high level when the pulse signal is received. Therefore, each pressing of the stapler 2 will get twice high levels in the voltage comparator. The controller determines whether this is the same pressing action or the next pressing action by processing the time difference between the receipt time of the two high levels, by which the operation of "count plus one" is processed accordingly. After a period of time when the count does not continue to be updated, the controller sends the newly obtained value to the NFC module. The recorded data can be easily read by using a mobile phone with a relevant app placed closed to the NFC module. The NFC module can work without power supply, so the energy storage module does not need to wirelessly charge the NFC module at this time. When stapler 2 is pressed, current also flows through the rectifying circuit, and an alternating current is generated at this time due to the opposite direction of the pressing and releasing motion. The alternating current is rectified into direct current through a rectifying circuit, and the direct current is sent to the energy storage module. The energy storage circuit in the energy storage module performs equalization, voltage regulation and current stabilization processing on the electric energy, so that it is converted into electric energy capable of safely charging the small supercapacitor. The energy storage module feeds the voltage of the small supercapacitor to the controller, enabling the controller to monitor the voltage of the energy storage module. When the controller finds that the voltage of the supercapacitor reaches a threshold, the energy storage circuit stops charging the supercapacitor. When the controller finds that the voltage of the supercapacitor is smaller than the threshold, the energy storage circuit begins to charge the supercapacitor. When there is a need to supply power to the controller, the energy storage module supplies power to the protection circuit, and the protection circuit provides safe power supply to the controller by overvoltage/overcurrent prevention and short circuit protection. The whole system does not need external power supply, and it is not necessary to connect an additional sensor. Stapler 2 can record and read the number of times of pressing when a normal stapling task is completed, thereby predicting the pressing life of Stapler 2.

Figure 5:
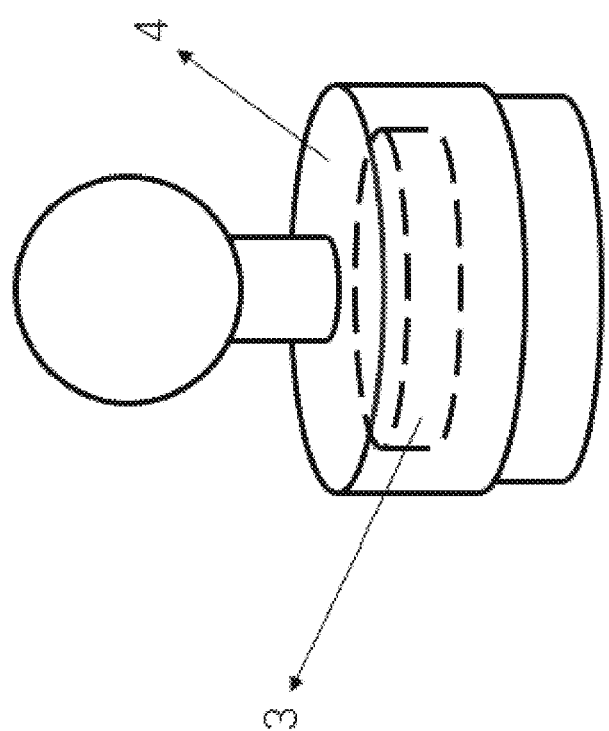
FIG. 5 is a schematic diagram of a structure of Embodiment B.
Figure 6:
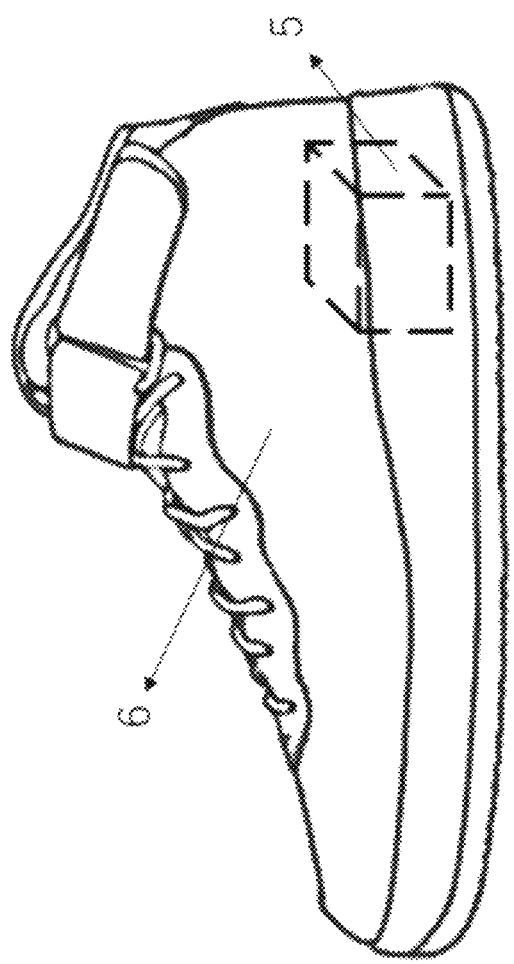
FIG. 6 is a schematic diagram of a structure of Embodiment C.

FIG. 5 shows Embodiment B where an inventive system of the present invention is used, and FIG. 6 shows Embodiment C where an inventive system of the present invention is used. The specific operations of the application Embodiment B and the application Embodiment C are substantially similar to the application Embodiment A. The difference is that the mechanical energy-based counting system can be used in the pressure-type stamp 3 of application Embodiment B can be driven by pressing the stamp, and the mechanical energy-based counting system can be used in the shoe 6 of the application embodiment C can be driven by stepping on the shoe. In the three application embodiments, the power generated by the application Embodiment C is largest. Therefore, in the application Embodiment C, the protection circuit can be connected to the external load, the system can charge the external load other than the controller and use as a charging battery. The systems in application Embodiment B and application Embodiment C do not require external power supply, and no additional sensors need to be connected. The pressure-type stamp 4 can realize the recording and reading of the pressing times when a normal stamping task is completed, thereby predicting the life of the pressure-type stamp 4. The shoe 6 can realize recording and reading the steps count by the shoe user while walking normally. It has a simple way to achieve with a high accuracy, no external power supply is needed, and is further superior to the existing step counting shoes in monitoring human health data.

In sum, the above-described are only certain preferred embodiments of the present invention and are not intended to limit the scope of the present invention. Any modifications, equivalent substitutions, improvements, etc. made within the spirit and principles of present invention are intended to be included within the scope of the protection of the present invention.

The invention claimed is:

1. A mechanical energy-based self-powering counting system, comprising: an electromagnetic power generator, a count measuring circuit, a count energy supply circuit, a controller, and a wireless transmission module, wherein:
    the electromagnetic power generator generates electricity by being driven by an external device, and transmits an input electrical signal to the count measuring circuit and an input signal to the count energy supply circuit, respectively;
    the count measuring circuit outputs a high level or low level to the controller based on the input electrical signal received from the power generator;
    the count energy supply circuit enters a charging state or stops charging under the control of controller, and also supplies power to the controller;
    the controller is configured to monitor a voltage of the count energy supply circuit, and control the count energy supply circuit according to a relationship between the voltage and a set voltage threshold; and
    the controller conducts counting operations according to a relationship between a pattern regarding the high level output and a counting rule whether to count the high level output, and transmits count data to the wireless transmission module for an external apparatus to read the count data.

2. The mechanical energy-based self-powering counting system of claim 1, wherein the count energy supply circuit comprises at least one voltage comparator.

3. The mechanical energy-based self-powering counting system of claim 1,
    wherein the count energy supply circuit comprises a rectifier circuit, an energy storage module and a protection circuit; wherein the rectifier circuit rectifies the electric energy and then supplies the rectified electric energy to the energy storage module;
    wherein the energy storage module feeds its voltage to the controller and outputs energy to the protection circuit, and
    wherein the protection circuit supplies power to the controller through rectification and filtering.

4. The mechanical energy-based self-powering counting system of claim 3,
    wherein the energy storage module comprises an energy storage component and an energy storage circuit, the energy storage circuit is configured to perform voltage equalization and stabilization and current stabilization, and delivers electric energy to the energy storage component for energy storage; and
    wherein the energy storage component feeds its voltage to the controller.

5. The mechanical energy-based self-powering counting system of claim 4, wherein the energy storage component is selected from the group consisting of a lithium battery, a supercapacitor or a flexible supercapacitor.

6. The mechanical energy-based self-powering counting system of claim 3, wherein the controller controls whether to wirelessly charge the wireless transmission module by using the energy storage module according to a charging type of the wireless transmission module.

* * * * *